(12) United States Patent
Norberg et al.

(10) Patent No.: US 8,720,277 B2
(45) Date of Patent: May 13, 2014

(54) PROCESS FLUID PRESSURE MEASUREMENT SYSTEM WITH IMPROVED COUPLING

(75) Inventors: Daniel A. Norberg, New Brighton, MN (US); Nathan L. Wiater, Victoria, MN (US)

(73) Assignee: Rosemount Inc., Chanhassen, MN (US)

( * ) Notice: Subject to any disclaimer, the term of this patent is extended or adjusted under 35 U.S.C. 154(b) by 70 days.

(21) Appl. No.: 13/483,686

(22) Filed: May 30, 2012

(65) Prior Publication Data

US 2013/0320662 A1      Dec. 5, 2013

(51) Int. Cl.
*G01L 7/00*     (2006.01)
(52) U.S. Cl.
USPC ............................................................ 73/756
(58) Field of Classification Search
None
See application file for complete search history.

(56) References Cited

U.S. PATENT DOCUMENTS

| | | | | |
|---|---|---|---|---|
| 4,722,228 | A * | 2/1988 | Awa et al. | 73/706 |
| 5,811,690 | A * | 9/1998 | Hershey | 73/861.42 |
| 7,258,017 | B1 | 8/2007 | Hedtke | 73/708 |
| 7,412,893 | B2 * | 8/2008 | Hedtke | 73/730 |
| 2005/0082828 | A1 | 4/2005 | Wicks et al. | |
| 2005/0126296 | A1 * | 6/2005 | Hedtke | 73/706 |
| 2005/0225035 | A1 | 10/2005 | Sundet | |
| 2007/0272027 | A1 * | 11/2007 | Hedtke | 73/756 |

FOREIGN PATENT DOCUMENTS

GB          2299841         10/1996

OTHER PUBLICATIONS

Notification of Transmittal of the International Search Report and the Written Opinion of the International Searching Authority, or the Declaration dated Oct. 23, 2013 for International Appln. No. PCT/US2013/0397967, filed Apr. 24, 2013. 13 pgs.
Invitation to Pay Fees dated Aug. 5, 2013 for International Appln. No. PCT/US2013/037967, filed Apr. 24, 2013.

* cited by examiner

*Primary Examiner* — Andre Allen
(74) *Attorney, Agent, or Firm* — Westman, Champlin & Koehler, P.A.

(57) ABSTRACT

A process pressure measurement system includes a remote seal assembly configured to couple to a process. The system has a remote seal diaphragm with a first side adapted to contact a process fluid and a second side adapted to contact a fill fluid. A first capillary conduit has a first coupling and is coupled to the remote seal and is filled with the fill fluid. A second capillary conduit is coupled to a process fluid pressure transmitter. The second capillary conduit is filled with the fill fluid. A second coupling is coupled to the second capillary conduit and to the first coupling to provide fluidic communication from the remote seal diaphragm to the pressure inlet of the process fluid pressure transmitter. At least one of the first and second couplings is sized to pass through a penetration in a process containment barrier.

10 Claims, 5 Drawing Sheets

PROCESS FLUID PRESSURE MEASUREMENT SYSTEM WITH IMPROVED COUPLING

BACKGROUND

Pressure transmitters are used to remotely monitor the pressure of a process fluid. Remote seals, or remote diaphragm assemblies, are often used to space the pressure transmitter from hazardous measurement environments, or for linking the pressure transmitter with inconveniently located process fluid. For example, remote seals are often used with corrosive or high temperature process fluids. In those situations, a remote seal having a diaphragm assembly and a capillary tube can be used to connect the pressure transmitter to the process fluid while the pressure transmitter is located a safe distance away. The capillary tube may extend tens of meters in order to couple the pressure transmitter with the process fluid. The remote seal communicates hydraulically with the process fluid through a thin flexible diaphragm, which is used to isolate the process fluid from a fill fluid used in the capillary tube. As the diaphragm flexes, the incompressible fill fluid translates the pressure change through the capillary tube to a diaphragm of a pressure sensor located in the pressure transmitter. Deflection of the pressure transmitter diaphragm is transmitted through a similar method to a pressure sensor disposed within the transmitter, which produces a signal related to the pressure of the process fluid.

Remote seal hydraulic systems are typically filled with the substantially incompressible fluid at the factory with a precise amount of fill fluid and then sealed. System performance is correlated with the precise level of fill fluid and is degraded with any oil leakage or the presence of air in the fill fluid. For severe applications, such as high temperature or high process vacuum service, specialized factory production methods are used to remove air from the fill fluid and permanently seal the hydraulic system. For some less severe applications, loss of a minute amount of fill fluid is acceptable.

One recent advance in the art of remote process seal couplings is provided in U.S. Pat. No. 7,258,017 and is entitled Industrial Process Pressure Transmitter with Field Repairable Remote Seals. This patent describes the ability to service a remote seal in the field, by decoupling and recoupling a remote process seal to a process pressure transmitter. While the quick-connect seals of the '017 patent are highly useful and provide important advantages in the field, in fact there are some instances where such couplings may not fully meet all of the application's requirements. For example, remote seals are often separated from the process fluid pressure transmitters through a barrier or containment structure, such as in the context of nuclear process measurements and control. Such applications may set forth a maximum dimension for penetrations through containment structures to assure that the process is contained. Narrow penetrations within the containment structure may inhibit the ability to route the remote seals to the installation location. For example, one specific containment application permits penetrations no larger than 19 mm in diameter, which generally prohibits the routing of a remote seal assembly through the penetration.

SUMMARY

A process pressure measurement system is provided. The system includes a remote seal assembly configured to couple to a process and having a remote seal diaphragm that has a first side adapted to contact a process fluid and a second side adapted to contact a substantially incompressible fill fluid. A first capillary conduit is coupled to the remote seal and is filled with the substantially incompressible fill fluid. A first coupling is coupled to the first capillary conduit. A process fluid pressure transmitter having a pressure sensor is operably coupled to a pressure inlet. A second capillary conduit is coupled to the process fluid pressure transmitter. The second capillary conduit is filled with the substantially incompressible fill fluid. A second coupling is coupled to the second capillary conduit and to the first coupling to provide fluidic communication from the remote seal diaphragm to the pressure inlet of the process fluid pressure transmitter. At least one of the first and second couplings is sized to pass through a penetration in a process containment barrier. A method of joining two closed fluid systems for process pressure measurement is provided. A remote process seal assembly is also provided.

DETAILED DESCRIPTION

Figure 1:
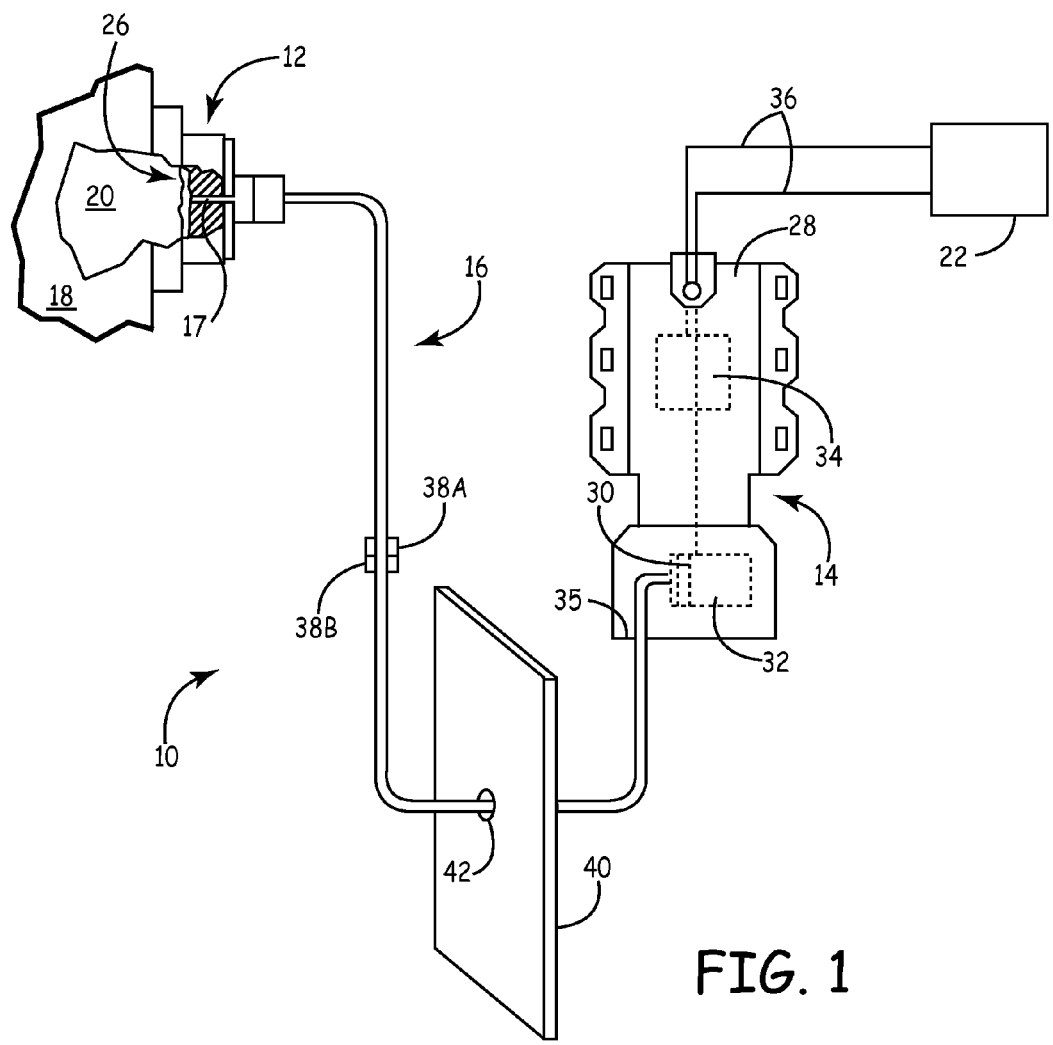
FIG. 1 is a diagrammatic view of a process control system in accordance with an embodiment of the present invention.

FIG. 1 shows process control system 10 where a capillary tube 16 having connector 38B, passes through aperture 42, which is smaller than connector 38B, in accordance with an embodiment of the present invention. System 10 includes remote seal 12, pressure transmitter 14, capillary tube 16, vessel 18, process fluid 20, and process control circuitry 22. Pressure transmitter 14 includes transmitter housing 28, which contains sensor diaphragm 30, pressure sensor 32, transmitter circuitry 34 and process diaphragm 35. Remote seal 12 conveys the pressure of process fluid 20 to process transmitter 14, whereby sensor 32 and transmitter circuitry 34 produce a pressure reading that is conveyed to process control circuitry through control loop 36. Couplings 38A and 38B link remote seal 12, pressure transmitter 14 and capillary tube 16 with each other such that they can be easily, and with negligible fluid loss, connected.

Remote seal 12 is in fluidic communication with process fluid 20 contained in vessel 18 through diaphragm 26, and with pressure transmitter 14 via capillary tube 16 and passageway 17, which are charged with a fill fluid. The fill fluid is a substantially incompressible hydraulic fluid for transmitting fluid pressure applied by process fluid 20 to diaphragm 26 to pressure transmitter 14. Typically, the hydraulic fluid comprises silicone oil, glycerin and water, propylene glycol and water, or any other fluid that is substantially incompressible, and may contain other additives. Thus, pressure transmitter 14 senses fluid pressure applied to diaphragm 26 by process fluid 20 through the hydraulic fill fluid. Process fluid 20 could, for example, be a corrosive or an extremely hot process fluid, such that pressure transmitter 14 is unable to contact, or operate in close proximity to, process fluid 20. Thus, remote seal 12 and capillary tube 16 are used to extend the reach of pressure transmitter 14. Remote seal 12 is typically bolted to vessel 18 using a flange.

A change in the pressure of process fluid 20 is hydraulically communicated to process diaphragm 35 by the fill fluid of capillary 16. This pressure is then communicated to pressure sensor 32 with a second fill fluid positioned between process diaphragm 35 and sensor diaphragm 30. The deflection of sensor diaphragm 30 in response to a change in the pressure of process fluid 20 is used to determine the pressure of process fluid 20 in vessel 18 using sensor 32. Sensor 32 can be, for example, a capacitance-based pressure sensor, in which the capacitance of pressure sensor 32 changes as a function of the pressure of process fluid 20, or sensor 32 can operate on other known sensing principles, such as piezoresistive strain gauge technology. Pressure sensor 32 produces a pressure signal based on the deflection of sensor diaphragm 30 that is indicative of the pressure of process fluid 20. Transmitter circuitry 34 within transmitter housing 28 produces an output signal that is a function of the pressure sensed by sensor 32 and communicates the pressure signal to process control circuitry 22 over control loop 36 so that the sensed pressure of process fluid 20 can be remotely monitored. Process control loop 36 can be a 4-20 mA control loop, a wired digital communication network, a wireless network such as a WirelessHART network in accordance with IEC 62591, or any other suitable communication system. In other embodiments, process transmitter 14 may include a local pressure indicator, such as an LCD display.

As illustrated in FIG. 1, system 10 is able to accommodate a process barrier or containment structure, illustrated diagrammatically at reference numeral 40, that allows a penetration 42 therethrough having a maximum diameter that is smaller than the diameter of remote seal 12, but larger than at least one of couplings 38A, and 38B. In accordance with some embodiments of the present invention, a capillary system is provided having a plurality of segments, where each segment is factory-filled. However, the segments can be joined together in the field prior to service. In some embodiments, each segment is sealed with a diaphragm that is punctured at the moment when the connection between couplings 38A and 38B is formed thereby bringing two factory-filled systems together in one new closed system. After the connection is made, the fill fluid from each segment becomes part of the same closed system. Accordingly, it is preferred that the two segments contained identical fill fluid.

Embodiments of the present invention generally provide a high quality, repeatable connection while avoiding potential issues. During the connection process, potential issues can typically occur at the moment the connection is made. Such issues include loss of fill fluid from the capillary or the introduction of air into the filled system which could later cause performance and/or reliability concerns. Additionally, after the connection is made, the connection needs to maintain a high quality seal. For example, for nuclear applications, such couplings must endure severe conditions comprised of radiation testing, submergence testing, saturation steam conditions, and vibration events.

Figure 2:
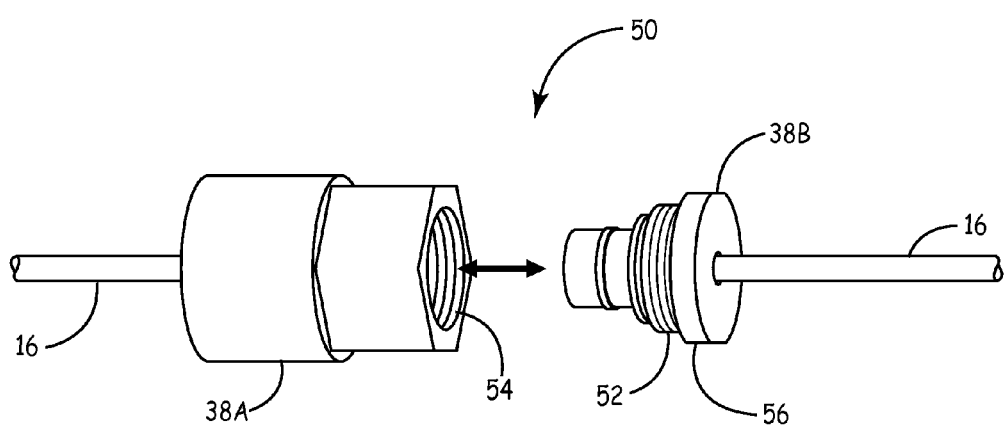
FIG. 2 is a diagrammatic view of a capillary coupling system in accordance with an embodiment of the present invention.

FIG. 2 is a diagrammatic view of a capillary coupling system in accordance with an embodiment of the present invention. System 50 includes connectors 38A and 38B, where each connector 38A and 38B is coupled to a capillary conduit 16. Preferably, each of connectors 38A, 38B is also coupled to a respective process element, such as a remote seal or process pressure transmitter. Further still, the respective connector, capillary conduit 16, and process element are filled with a substantially incompressible fill fluid during manufacture, and sealed such that no air is present in the system.

Connectors 38A and 38B are joined together in the field when the process elements are installed at the process. As illustrated in the embodiment of FIG. 2, connector 38B generally has a smaller diameter than connector 38A, and thus connector 38B is generally selected to pass through process barriers or containment walls. Preferably, connector 38B has external threads 52 that are sized and configured to engage internal threads 54 of connector 38A. Additionally, connector 38B includes a surface 56 that includes one or more wrench flats that are configured to receive a wrench in order to impart sufficient torque to connector 38B to seal the connectors together. Those skilled in the art will appreciate that embodiments of the present invention can allow various different size couplings to be used for the pre-filled system and then assembled at the site of the process barrier. Thus, as long as one of the two couplings is sized to pass through the process barrier, there are no physical limitations on the size of the other coupling. This provides flexibility and may make product selection easier for end users.

Figure 3:
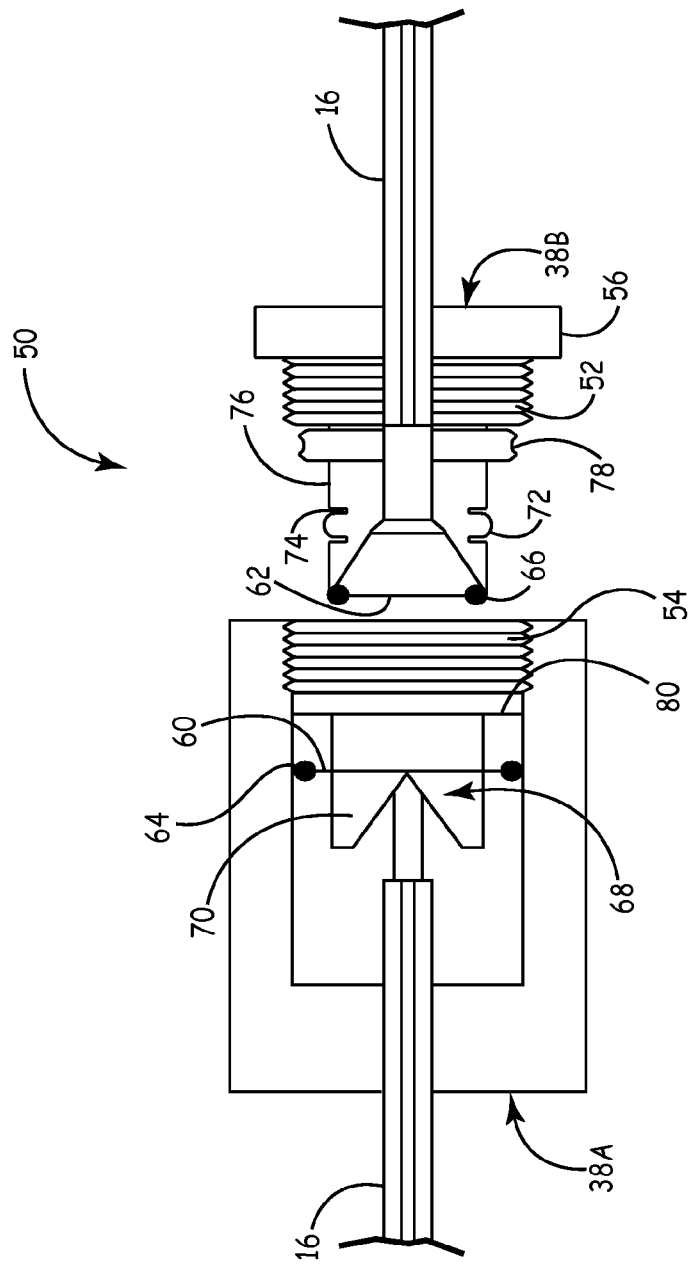
FIG. 3 is a diagrammatic cross section view of a process pressure coupling system in accordance with an embodiment of the present invention.

FIG. 3 is a diagrammatic cross section view of system 50 in accordance with an embodiment of the present invention. Each of connectors 38A and 38B preferably includes a diaphragm 60, 62, respectively, that is configured to be pierced, or otherwise punctured when the two connectors are joined together. Each of diaphragms 60, 62 is preferably welded to its respective connector, at welds 64, 66, respectively. Utilization of a welded diaphragm provides a high quality, robust seal that, once punctured, will not form again. This allows for the manufacture of a closed fluid system segment. Moreover, the manufactured closed system can be controlled such that no air or other undesirable gases exist in the fluid. Each of diaphragms 60, 62 is preferably constructed from a 0.001 inch thick metal, such as stainless steel. As shown in FIG. 3, at least one of connectors 38A and 38B includes a structure 68 that is configured to puncture the diaphragms as the two connectors are brought together. In the embodiment illustrated in FIG. 3, structure 68 is in the form of a sharp point that is spaced slightly away from diaphragm 62.

Each connector thus forms a closed fluid system with its respective system process component, such as remote seal 12 or field device 14. Specifically, connector 38A forms a closed fluid system segment with fill fluid extending from location 70 proximate diaphragm 62 through capillary conduit 16 to remote seal 12. Similarly, fill fluid is also present proximate diaphragm 62 extending through capillary conduit 16 to pressure transmitter 14.

At least one of connectors 38A and 38B preferably includes features to inhibit or otherwise prevent the introduction of air or other gases while the two connectors are joined together. As illustrated in the embodiment of FIG. 3, radial elastomeric O-ring 72 is disposed within a groove 74 in surface 76. Additionally, connector 38B also includes an O-ring configured to support a permanent seal, such as metallic O-ring 78, disposed about surface 76. When the two connectors are fully joined together, metallic O-ring 78 bears against surface 80 of connector 38A.

The operation of connectors 38A and 38B will now be described with respect to FIGS. 4A-4D which show various stages of the connectors being joined together.

Figure 4A:
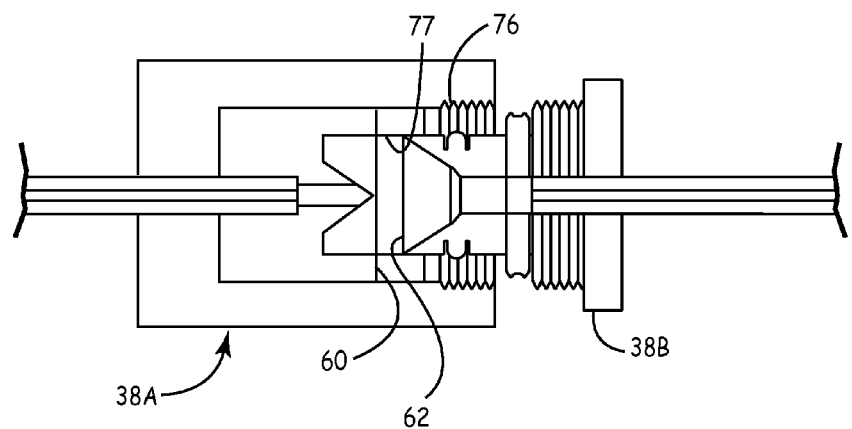
FIGS. 4A-4D are a diagrammatic cross sectional view illustrating various stages of a pair of connectors being joined together in accordance with an embodiment of the present invention.

FIG. 4A is a diagrammatic cross sectional view illustrating connectors 38A and 38B beginning to be joined together. Specifically, surface 76 slides within internal surface 77, and diaphragm 62 has not yet made contact with diaphragm 60.

Figure 4B:
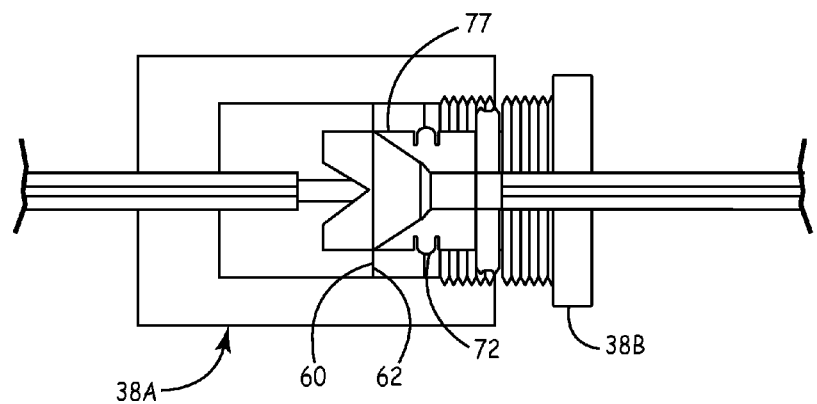

FIG. 4B is a diagrammatic cross sectional view of connectors 38A and 38B engaged further, in accordance with the an embodiment of the present invention. In FIG. 4B, connector 38B has been inserted to such an extent that diaphragm 62 now bears directly against diaphragm 60. Additionally, as can be seen in FIG. 4B, O-ring 72 has now made contact with internal surface 77 of connector 38A. By ensuring that O-ring 72 contacts surface 77 prior to the diaphragms 60, 62 being punctured, the actual design of connectors 38A, 38B ensures that fill fluid leakage will be minimized. Further, the possibility of introducing air or other undesirable gases into the substantially incompressible fill fluid is minimized, or at least reduced.

Figure 4C:
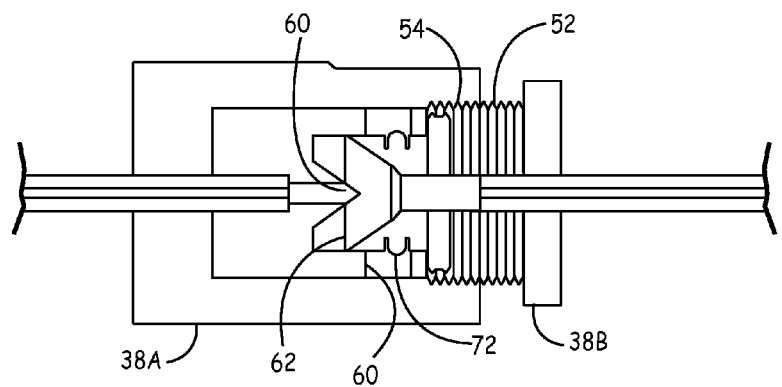

FIG. 4C is a diagrammatic cross sectional view of connectors 38A and 38B further engaged in accordance with an embodiment of the present invention. As illustrated in FIG. 4C, connector 38B has been engaged to such an extent that the external threads 52 are now beginning to be engaged with internal threads 54. Moreover, diaphragms 62, 64 have been punctured, or otherwise pierced, by piercing structure 68. Although the diaphragm has been punctured, any fill fluid leakage is minimized since O-ring 72 is now fully engaged with surface 78 thereby forming a fluid-tight seal.

Figure 4D:
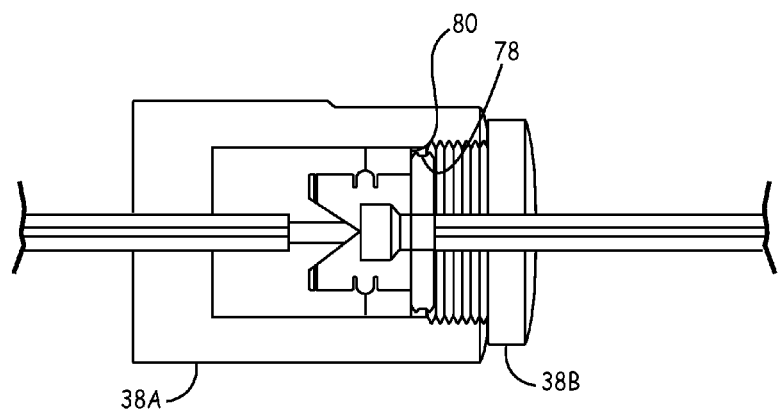

FIG. 4D is a diagrammatic cross sectional view of connectors 38A and 38B engaged further, in accordance with an embodiment of the present invention. Specifically, connector 38B is now engaged with connector 38A to such an extent that metallic O-ring 78 contacts surface 80. When finally assembled, metallic O-ring 78 is compressed between connector 38B and surface 80 of connector 38A thereby forming a permanent fluid-tight seal. Once the two connectors are joined together, as illustrated through FIGS. 4A-4D, a single closed-system is created where very little, if any, air or undesirable gases has entered the system.

Embodiments of the present invention generally provide features where each process segment can be sealed with diaphragms that are punctured at the moment when a connection is formed between the two segments, thereby bringing the two filled systems together in one new closed system. After the connection is made, the fill fluid from each segment becomes part of the same closed system. Embodiments of the present invention generally reduce the chances that issues will occur during the connection process. Specifically, issues that are addressed by embodiments of the present invention include the loss of fill fluid from the capillary or the inclusion of air or other undesirable gases into the fill system which could later cause performance and reliability concerns. Additionally, after the connection is made, embodiments of the present invention maintain a high quality seal, which, for nuclear applications, is able to endure severe conditions comprising radiation testing, submergence testing, saturated steam conditions, and vibration events. Additionally, since O-ring 72 engages before the diaphragms are severed, oil loss can be prevented and any changes to the remote seal's oil fill constant value can be minimized to an insignificant value. As used herein, "oil fill constant" is intended to mean the position of the remote seal diaphragm which indicates the volume of oil fill within the remote seal system. If the coupling mechanism described herein functions effectively, there will be negligible changes in this value, or oil volume, within the remote seal system. Further, radial O-ring 72 allows the system to be sealed while allowing the assembly to slide together to puncture the diaphragms at the same time. The diaphragms are preferably severed by sharp mating features, which are machined into at least one and preferably each segment. When the diaphragms are pierced, the two filled systems are brought together. Diaphragm piercing structure 68 is generally configured to cut through the diaphragm in a consistently high-quality manner. The magnitude of force required to puncture the diaphragms may depend on diaphragm thickness, diaphragm diameter, the geometry of the leading edges, as well as the location of the initial puncture. It is believed that a design containing thin diaphragms will ensure that the diaphragms are punctured. The allowed movement of fill fluid within the capillary assembly may also facilitate the process.

Embodiments of the present invention are generally able to repeatedly puncture diaphragms without causing pieces of the diaphragms to be fractured and enter the fill fluid system. The puncture, or cut made in the diaphragm must also be made in such a way that any resulting restrictions within the capillary system are negligible, and in such a way that the time response of the final capillary system is not affected by the coupling connection. Further, the diaphragms must therefore be cut in a manner in which they do not interfere with the fill fluid's flow within the capillary system.

Although the present invention has been described with reference to preferred embodiments, workers skilled in the art will recognize that changes may be made in form and detail without departing from the spirit and scope of the invention.

What is claimed is:

1. A process pressure measurement system comprising:
   a remote seal assembly configured to couple to a process, the remote seal having a remote seal diaphragm that has a first side adapted to contact a process fluid and a second side adapted to contact a substantially incompressible fill fluid;
   a first capillary conduit coupled to the remote seal, the first capillary conduit being filled with the substantially incompressible fill fluid;
   a first coupling coupled to the first capillary conduit;
   a process fluid pressure transmitter having a pressure sensor operably coupled to a pressure inlet;
   a second capillary conduit coupled to the process fluid pressure transmitter, the second capillary conduit being filled with the substantially incompressible fill fluid;
   a second coupling coupled to the second capillary conduit and to the first coupling to provide fluidic communication from the remote seal diaphragm to the pressure inlet of the process fluid pressure transmitter; and
      wherein at least one of the first and second couplings is sized to pass through a penetration in a process containment barrier.

2. The process pressure measurement system of claim 1, wherein another of the first and second couplings is sized such that it may not pass through the penetration.

3. The process fluid pressure measurement system of claim 1, and further comprising a metallic o-ring disposed between the first and second couplings.

4. A method of joining two closed fluid systems for process pressure measurement, the method comprising:
   providing a first closed fluid system including a remote seal assembly coupleable to a process, the first closed fluid system including a first coupling having a first coupling diaphragm;
   providing a second closed fluid system including a process pressure transmitter having a pressure sensor therein, the second closed fluid system including a second coupling having a second coupling diaphragm;
   bringing the first and second coupling diaphragms into contact with each other;
   puncturing the first and second coupling diaphragms within an enclosed volume;
   forming a seal between the first and second couplings in conjunction with puncturing the first and second coupling diaphragms.

5. The method of claim 4, wherein the enclosed volume is formed around the first and second coupling diaphragms before the first and second coupling diaphragms are punctured.

6. The method of claim 5, wherein the enclosed volume is formed by an external cylindrical surface of one of the first and second couplings cooperating with an internal cylindrical surface of the other of the first and second couplings.

7. The method of claim 6, and further comprising sealing the external cylindrical surface and the internal cylindrical surface together using a radial, elastomeric o-ring.

8. The method of claim 4, wherein forming the seal between the first and second couplings includes compressing a metallic o-ring between the first and second couplings.

9. The method of claim 4, wherein puncturing the first and second coupling diaphragms includes forcing the first and second coupling diaphragms against a diaphragm puncturing structure disposed in one of the first and second couplings.

10. The method of claim 4, wherein bringing the first and second coupling diaphragms into contact with each other includes passing at least one of the first and second couplings through a penetration of a process containment barrier.

\* \* \* \* \*